United States Patent
Kee et al.

(10) Patent No.: US 8,730,295 B2
(45) Date of Patent: May 20, 2014

(54) AUDIO PROCESSING FOR VIDEO CONFERENCING

(75) Inventors: Tommy Kee, Richmond (CA); Wilfrid LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 222 days.

(21) Appl. No.: 13/165,517

(22) Filed: Jun. 21, 2011

(65) Prior Publication Data

US 2012/0327177 A1 Dec. 27, 2012

(51) Int. Cl.
*H04N 7/14* (2006.01)

(52) U.S. Cl.
USPC .................................. 348/14.08; 379/93.21

(58) Field of Classification Search
USPC .............. 348/14.01, 14.08, 14.16; 379/93.21, 379/158, 202.01
See application file for complete search history.

(56) References Cited

U.S. PATENT DOCUMENTS

| | | | |
|---|---|---|---|
| 7,433,716 B2 * | 10/2008 | Denton ...................... | 455/569.1 |
| 7,489,772 B2 * | 2/2009 | Szomolanyi et al. .... | 379/202.01 |
| 7,539,290 B2 * | 5/2009 | Ortel .......................... | 379/88.02 |
| 7,564,476 B1 | 7/2009 | Coughlan et al. | |
| 8,044,989 B2 | 10/2011 | Mareachen | |
| 8,340,258 B2 | 12/2012 | Baker et al. | |
| 2004/0013252 A1 * | 1/2004 | Craner ..................... | 379/142.01 |
| 2005/0003852 A1 | 1/2005 | Song | |
| 2006/0104458 A1 * | 5/2006 | Kenoyer et al. ................. | 381/92 |
| 2012/0075407 A1 * | 3/2012 | Wessling ................... | 348/14.08 |

* cited by examiner

*Primary Examiner* — Olisa Anwah
(74) *Attorney, Agent, or Firm* — Sterne, Kessler, Goldstein & Fox PLLC (57) ABSTRACT

Methods, systems, and computer program products for enhancing transmitted audio signals for a video conference call are disclosed. Facial recognition technology and audio processing techniques determine a position of a speaking member of a party on a video conference. Based on the determined position of the speaking member, the directionality of the received audio signals can be adjusted towards the speaking member. The video conference system can transmit the adjusted audio signals.

23 Claims, 5 Drawing Sheets

AUDIO PROCESSING FOR VIDEO CONFERENCING

BACKGROUND

1. Field of the Invention

The present invention relates to the field of audio processing for video conferencing.

2. Background Art

With increased bandwidth provided by network carriers, video telephony has become more widespread. A person may initiate a video conference to another person for various purposes, such as for a business meeting of two companies located a great distance from one another. Video conferencing systems may be standalone systems coupled to a television or computer monitor, or may be incorporated into desktop phones, desktop computers, tablet computers, laptop computers, or cellular phones/smartphones.

BRIEF SUMMARY

Disclosed herein are methods, systems, and computer program products for enhancing audio for a video conference. Audio signals may be received from a microphone array during a video conference between a party and a third party. A position of a speaking member of a party may be determined using facial recognition techniques or audio processing. Signals from the microphone array may be adjusted using a beam forming strategy to emphasize the signals from the speaking member. Adjusted audio signals may be transmitted to the third party.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Video conferencing systems, as used herein, may include video phone systems, which typically serve two individuals. Video conference systems may also serve two or more groups of individuals, for example, two or more groups of business employees. Video conferencing systems may also include telepresence systems. The term video conferencing system as used herein may also include systems using a web camera (web cam), a computer, and associated software, to provide audio and video streaming via the computer to another computer or video conferencing system. Such systems may be implemented in devices such as desktop phones, tablet computers, laptop computers, desktop computers, or mobile telephones.

As used herein, the term "party" refers to one side of a video conference. A party may include one or more people or members to the video conference. Each member of the party to the video conference may be a speaking member of the video conference.

With the wider adoption of video conferencing systems, including video telephony systems, users may be concerned about their privacy on such a video conference, due to the visual nature of the conference. Although video conference provides a greater experience to all parties to a video conference, users may desire to protect their privacy during the conference for various reasons.

For example, during a business negotiation taking place on a video conference, a party may wish to privately discuss their strategy with colleagues without either seeming rude to another party, or without having another party inadvertently view aspects of such a private discussion. Similarly, a party to a video conference may find the visual experience disconcerting, and wish to selectively mute the transmission of video.

Thus, video conferencing systems may provide the ability for a party to manually mute transmission of video from that party's system, and instead transmit a black screen to other parties to the conference. For example, the shutter on a camera used for video conferencing may close to protect a party's privacy. Such systems, however, typically require that the party requesting privacy make an active decision to mute the conference. Such a decision may be made by pressing a button or executing a menu option in software used to control a video conference.

The party may forget to mute the conference, which may lead to an embarrassing situation. Additionally, the party may find it onerous to continually or repeatedly press a button or take another action to mute the conference.

Facial recognition techniques may analyze features of a person's face to determine the identity of a person. For example, the distance between a person's pupils, the distance between their ears, the shape of a user's nose, and other characteristics may be used to identify a person. Such facial recognition techniques may commonly be used for security purposes or law enforcement purposes. Facial recognition techniques may also be used by digital cameras or digital photo processing software to identify faces in photographs.

Facial recognition techniques, such as face detection techniques, may also be used to determine the presence or absence of a person. For example, facial recognition techniques may analyze objects currently present in a video frame or picture, and determine whether any of the objects represent a person's face. Further, facial recognition techniques may be used to determine where a user is currently looking or focused, based on the location or direction of the person's pupils. Facial recognition techniques may also be used to determine a particular user or users who are talking, by determining whether a user's lips are moving.

Image-based face recognition techniques may include, but are not limited to, Principal Component Analysis, Independent Component Analysis, eigenface, Linear Discriminate Analysis, Elastic Bunch Graph Matching, Trace Transform, Active Appearance Model, a Hidden Markov Model, line edge matching, Support Vector Machine, dynamic link matching, and three-dimensional facial recognition.

Figure 1:
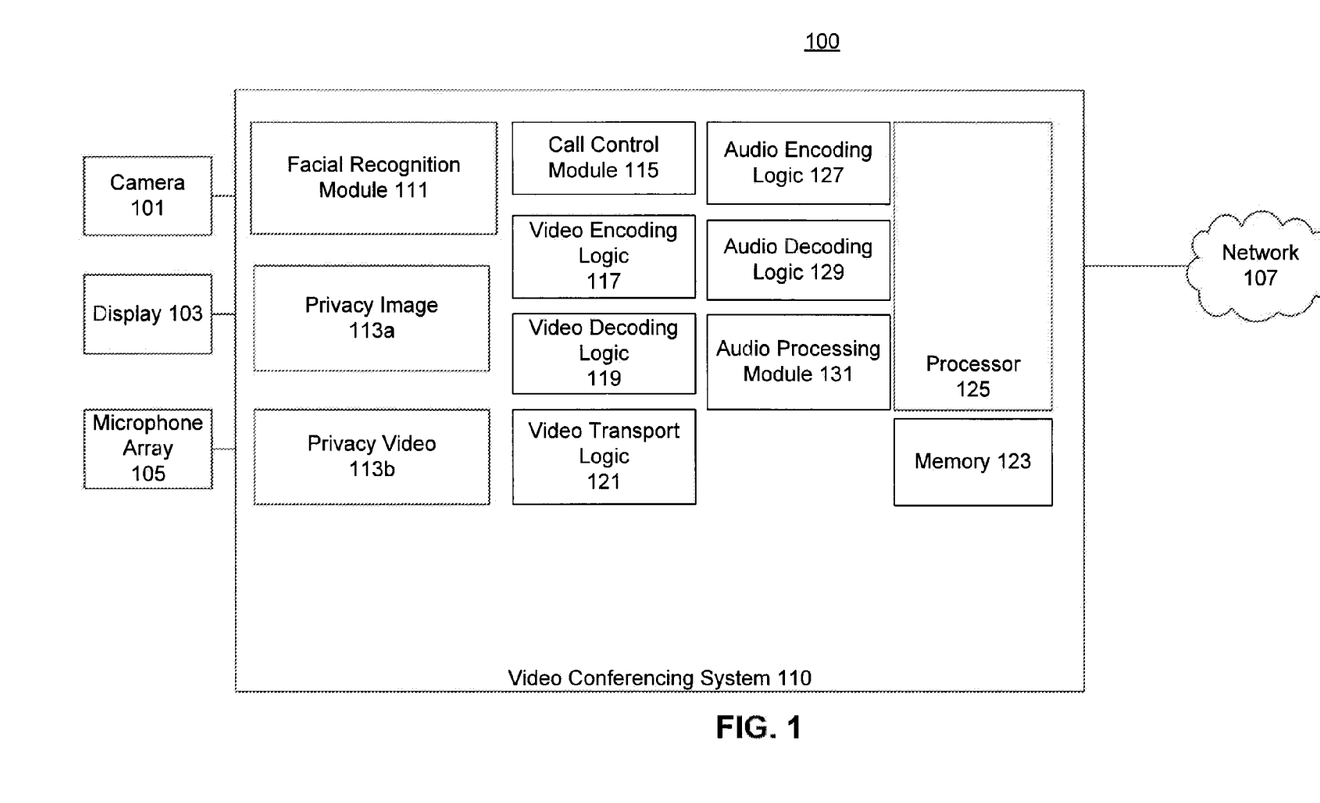
FIG. 1 is a diagram of a video conferencing system in accordance with embodiments.

FIG. 1 is a diagram of a system 100 including a video conferencing system 110. Video conferencing system 110 may be implemented as a standalone device, or components of video conferencing system 110 may be implemented in other devices. For example, components of video conferencing system 110 may be implemented in a laptop computer, or a mobile telephone. Video conference system 110 may also be implemented, for example and without limitation, in a set top box.

Components of video conferencing system 110 may comply with standards and recommendations from various organizations. For example, video conferencing system 110 may comply with the H.320 umbrella standard for video conferencing from the ITU Telecommunication Standardization Sector. Video conferencing system 110 may also comply with the H.323 recommendation for video over local area networks or wide area networks. Video conferencing system 110 may also comply with the Session Initiation Protocol (SIP) from the Internet Engineering Task Force (IETF) Network Working Group.

Video conference system 110 may receive data from camera 101. Camera 101 may be a commonly available camera configured for use in video conferencing systems. Aspects of camera 101 may be configurable by a user of video conferencing system 110. Camera 101 may be controlled by a user of video conferencing system 110 to pan left and right, tilt up or down, and zoom. Camera 101 may also include an analog-to-digital converter to convert analog signals into digital signals, which may be provided to video encoding logic 117 of video conference system 110.

Video conference system 110 may output data, such as video data, to display 103. Display 103 may be, depending on the implementation of video conference system 110, a television, computer monitor, projector, or other device capable of displaying signals provided by video conference system 110. Display 103 may comply with the NTSC standard or the PAL standard for displaying video.

Video conference system 110 also receives data from microphone array 105. Microphone array 105 may include one or more microphones arranged according to a desired configuration. Each microphone of microphone array 105 may detect sound, such as speech, for a video conference and convert the detected sound into electrical signals. Each microphone in microphone array 105 may be a unidirectional, omnidirectional, bidirectional, cardioid, or other type of microphone.

Camera 101, display 103, and microphone array 105 may be integrated into video conference system 110, or may be separate components that can be interchanged or replaced. For example, camera 101, display 103, and microphone array 105 may be part of a laptop computer or dedicated video conferencing system. Alternatively, camera 101 can connect to a video conference system 110 via USB, FireWire, Bluetooth, WiFi, or any other connection type. Similarly, display 103 may connect to a video conference system 110 using an appropriate connection mechanism, for example and without limitation, HDMI, DisplayPort, composite video, component video, S-Video, DVI, or VGA. Microphone array 105 may connect to video conference system via USB, an XLR connector, a ¼" connector, or a 3.5 mm connector.

Video conference system 110 may be connected to network 107. Network 107 may be a local area network or a wide area network such as the Internet or a cellular network. Network 107 may provide connectivity to others using video conferencing systems compatible with video conference system 110.

Video conference system 110 includes facial recognition module 111. Facial recognition module 111 may analyze the output of camera 101 for its operation. Facial recognition module 111 may use known techniques, as described herein, to recognize the face of a party to a video conference as described herein. Further, facial recognition module 111 may be used to track the presence or absence of a party to the conference, or the focus of the party to the conference. Facial recognition module 111 may output a facial recognition signal that identifies whether a particular party is present or absent, or whether the party is focused on the video conference. Facial recognition module 111 may also be configured to recognize if a member of a party is speaking, by analyzing the movement of the member's facial features.

Video conference system 110 may also include call control module 115. Call control module 115 may be configured to initiate and maintain a video conference call with one or more third parties. For example, in compliance with the H.323 protocol, call control module 115 may be configured to connect to another video conferencing party using a URL, transport address, e-mail address, or other type of alias. Call control module 115 may also be configured to receive a request for a video conference call from third parties using similar information. Further, call control module 115 may include a multiport control unit used to bridge videoconferencing connections.

Video conference system 110 may also include video encoding logic 117. Video encoding logic 117 may encode the video data received from camera 103 in accordance with a known codec, such as MPEG-2, H.264, H.263+, or other codecs suitable for video conferencing. Video encoding logic 117 may also compress encoded video for transmission.

Video conference system 110 may also include video decoding logic 119. Video decoding logic allows video conference system 110 to decode a video stream obtained via network 107 such that it can be interpreted and properly displayed on display 103. Video decoding logic 119 may be configured to support a number of known codecs such that video conferencing system 110 may be used with different third-party video conferencing systems.

Video conference system 110 also includes audio encoding logic 127 and audio decoding logic 129. Audio encoding logic 127 may encode the electrical signals of audio data received from microphone array 105 in accordance with a known codec suitable for video conferencing. Audio encoding logic 127 may also compress encoded audio for transmission. Audio decoding logic 129 may allow video conference system 110 to decode an audio stream obtained via network 107 such that it can be interpreted and properly output by video conferencing system 110. Audio decoding logic 129 may be configured to support a number of known codecs such that video conferencing system 110 may be used with different third-party video conferencing systems.

Video encoding logic 117, video decoding logic 119, audio encoding logic 127, and audio decoding logic 129 may be implemented in software or on a separate hardware component. Implementing these elements of video conferencing system 110 on a separate hardware component may improve performance.

Video conference system 110 may also include audio processing module 131. Audio processing module 131 may, in conjunction with facial recognition module 111, be configured to determine the position of a speaking member of a party or speaking members of the party. In accordance with embodiments, audio processing module 131 may utilize a beam forming strategy to adjust the directionality of signals received by microphone array 105 to emphasize signals received from the speaking party or parties.

Video conference system 110 may also include video transport logic 121. Video transport logic 121 may be responsible for distributing video and audio from video encoding logic 117 and audio encoding logic 127 to the other parties to the video conference. Video transport logic 121 may operate in compliance with the Real-time Transport Protocol (RTP) standardized packet format, in conjunction with the RTP Control Protocol. The RTP standardized packet format is defined by RFC 3550. Video transport logic 121 may include an RTP sender to transmit video and audio data from video encoding logic 117 and audio encoding logic 127 to other participants of the video conference. Video transport logic 121 may also include an RTP receiver to capture RTP packets from other video conferencing system to be provided to video decoding logic 119 and audio decoding logic 129.

Video conference system 110 also includes memory 123. Memory 123 may store one or more privacy settings or conditions in accordance with embodiments. Memory 123 may also store one or more resume conference conditions in accordance with embodiments. Memory 123 may also store one or more privacy images 113a to be transmitted when video conference system 110 enters a privacy mode. Memory 123 may also store one or more images of faces of members of a party to a video conference to assist facial recognition module 111. Further, memory 123 may store one or more privacy videos 113b to be transmitted when video conference system 110 is in a privacy mode. Memory 123 may be any type of persistent memory.

Video conference system 110 may also include processor 125. Processor 125 may be a general purpose or special purpose processor. Facial recognition module 111 and audio processing module 131 may be implemented, for example and without limitation, on processor 125, or using separate processors.

Figure 2:
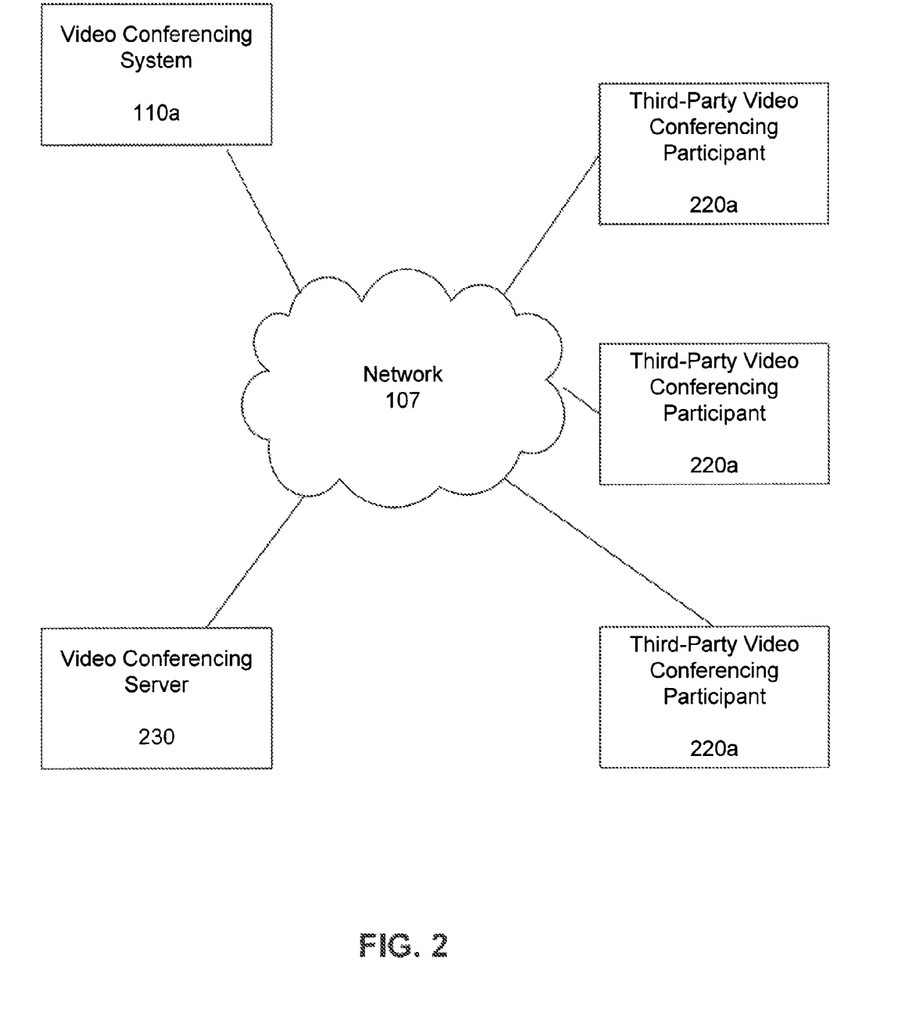
FIG. 2 is a diagram of a video conferencing environment.

FIG. 2 is a diagram of an environment 200 in which embodiments may be implemented. Environment 200 includes a video conferencing system 110a as described herein. Video conferencing system 110a is connected to network 107. Environment 200 also includes third party video conferencing participants 220a-220c. Third party video conferencing participants may use a video conferencing system such as video conferencing system 110, or may use a standards-compliant video conferencing system that can communicate with video conferencing system 110.

Environment 200 may also include video conferencing server 230. Video conferencing server 230 may be configured to coordinate video conferencing sessions between and among one or more of third party video conferencing participants 220a-c and video conferencing system 110.

Figure 3:
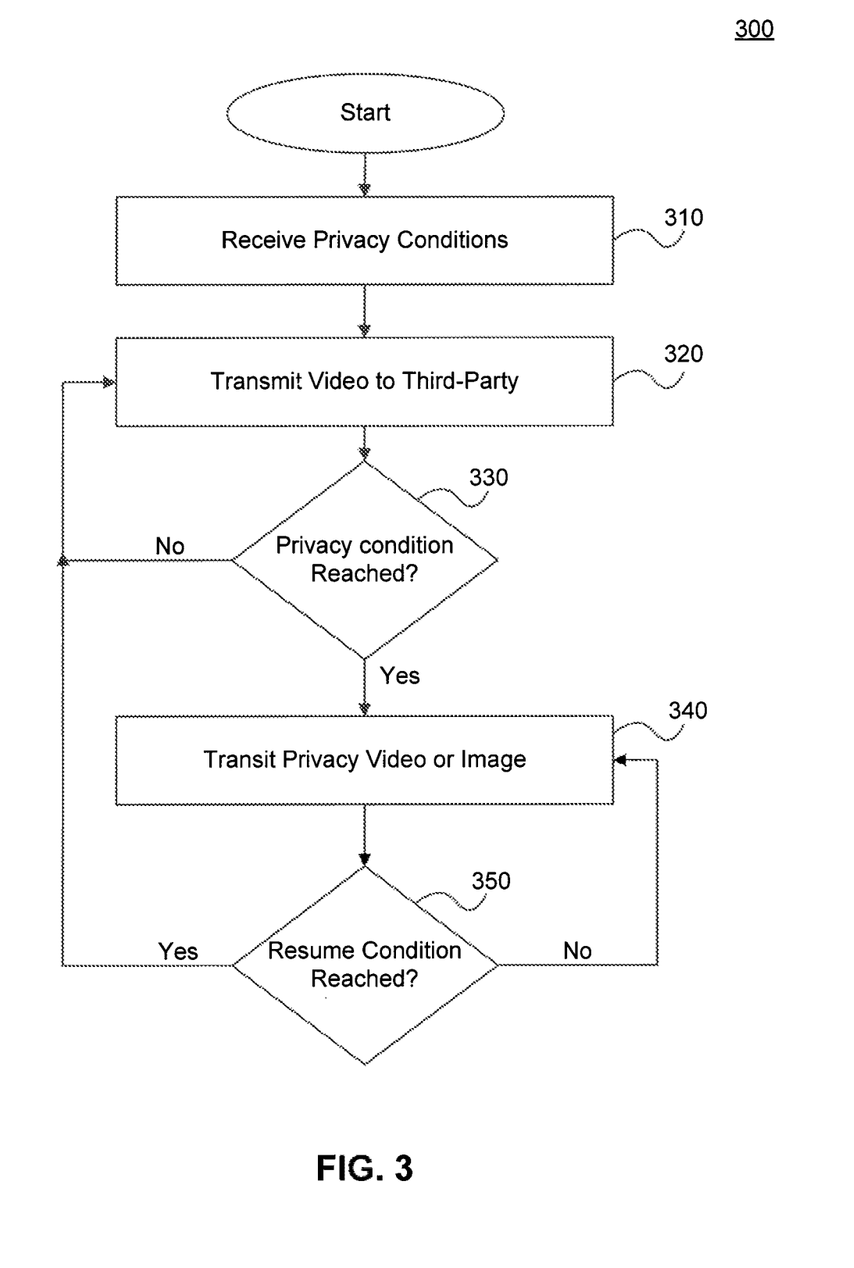
FIG. 3 is a flow diagram of a method in accordance with embodiments.

Referring to FIG. 2, detecting the party's intent to enter a privacy mode and causing a video conference system to enter a privacy mode may enhance the party's privacy. FIG. 3 is a diagram of a method 300 for enhancing a party's privacy on a video conference. Method 300 may be implemented in and is described with reference to, for example and without limitation, a video conference system 110. However, method 300 is not limited in this way and may be implemented in other systems.

At block 310, one or more privacy conditions for a video conference are received. A party may specify various privacy conditions. For example, a party may specify that the privacy mode should be entered when, a particular user's face has not been detected by the video conference system for a threshold amount of time, such as 5 seconds. Privacy conditions may also include resume conference conditions, or conditions to be reached that signify when the privacy mode should be exited and the conference resumed. Privacy conditions and resume conference conditions may be stored, for example and without limitation, in memory 123.

A video conference may be initiated by call control module 115. At block 320, video of the party is transmitted to the one or more third parties that the party is currently on a video conference with. Video may be transmitted in accordance with known methods. For example, video may be encoded and compressed by video encoding logic 117 according to the H.264 standard and transmitted over a wide area network, such as the Internet, by video transport logic 121. Video may be transmitted at block 320 after the user has initiated a video conference or received a request to join a video conference.

At decision block 330, a determination is made as to whether a privacy condition has been reached. The privacy condition may be based in part on a facial recognition signal from a facial recognition module 111. Further, the privacy condition may also be based on the party's privacy conditions stored in memory 123. For example, video captured by camera 101 may be analyzed by processor 125 in conjunction with facial recognition module 111. Based on the analysis, and a signal from facial recognition module 111, a determination may be made as to whether the analyzed video meets a privacy condition stored in memory 123. As a specific example consistent with the example in block 310, facial recognition module 111 may determine that a speaker turned (her face) away from the camera 101 for a threshold period of time (e.g. 5 sec), which may be determined to be a request for privacy, possibly for a private conversation that is not meant to be broadcast. Facial recognition software could detect this by determining the presence, and then absence of the speaker's pupils, as would occur if the speaker aimed away from the camera during speaking.

If the privacy condition has not been met at decision block 330, method 300 may return to block 320, and video of the party may continue to be transmitted to the third parties.

If, at decision block 330, a privacy condition has been reached, method 300 proceeds to block 340. At block 340, a privacy video or privacy image is transmitted to the one or more third-parties that the party is communicating with over network 107. The privacy image may simply be a black screen. Alternatively, the privacy image or privacy video may be previously provided by the party controlling video conferencing system 110, and may be stored in memory 123. For example, the privacy image may be one or more pre-loaded static images, such as images of one or more of the persons conference call, or a corporate logo, for example. Further, a message (or data) indicative of the privacy mode may be transmitted to the one or more third-parties at block 340. Other privacy images will be apparent to those skilled in the art.

At decision block 350, a determination is made as to whether a resume conference condition has been reached. The resume conference condition may be based again on an analysis of the video captured by camera 101 and a signal from facial recognition module 111. Based on the analysis, a determination may be made as to whether the analyzed video meets a resume conference condition stored in memory 123. For example, the party may specify a resume conference condition that specifies that if her face is detected for one second, the video conference should resume. The party may also specify that if the facial recognition module 111 detects that she is focused on the camera or on the conference, then the conference should resume. For example, facial recognition module 111 could detect the party's pupils looking at the camera with or w/o speaking.

If the resume conference condition has been reached, at decision block 350, the method returns to block 320. If the resume conference condition has not been reached, the method returns to block 340 and the privacy image or privacy video is still transmitted.

Certain video conferencing solutions are peer-to-peer, that is, one party directly connects to another. Other video conferencing systems may involve a central server, such as video conferencing server 230, responsible for routing communications from one party to other parties. In such a system, if the privacy condition has been reached at block 340, a signal may be sent to the video conferencing server 230. The video conferencing server 230 may then transmit the privacy image or video to the third parties. Similarly, the video conferencing server 230 may receive a signal if a resume conference condition is reached, and resume transmission of video of the party.

Further, if a video conferencing server is responsible for various aspects of video conferencing, the facial recognition module may be part of the video conferencing server 230. That is, the video conferencing server 230 may analyze the incoming video stream from video conferencing system 110 and determine if a privacy condition has been reached. Based on this determination, the video conferencing server 230 may transmit either the video stream from the party or a privacy image or video, in accordance with method 300.

The party may specify various criteria in her privacy setting. For example, as described above, a privacy setting may specify that, if the facial recognition module 111 does not recognize a particular party for a threshold amount of time, then the privacy mode may be entered.

Depending on the facial recognition techniques used, the facial recognition module 111 may be able to identify the party's focus, as described above. Thus, privacy conditions may indicate that if the party is not focused on the conference for a threshold amount of time, then the privacy mode should be entered.

The resume conference conditions may specify similar conditions. For example, the resume conference conditions may specify that, during privacy mode, if the party is detected for 2 seconds, or another threshold amount of time, privacy mode should be exited and method 300 should return to block 320. Similarly, the resume conference condition may be dependent on the focus of the party to the conference.

In an embodiment, the privacy image may vary. For example, the privacy image may specify to the third parties that the party is currently in privacy mode. Additionally, the privacy image may be a still image specified by the party. Additionally, the privacy image may be a still image of the last frame or image captured by the camera of the party's video conference system.

Entering privacy mode may also send a signal to the other parties of the video conference. If the other parties on the conference have compatible video conferencing systems, the signal may trigger those video conferencing systems to display local videos configured by those parties. For example, the video conferencing system 220a of a third party may display a screensaver type image or other video.

Figure 4:
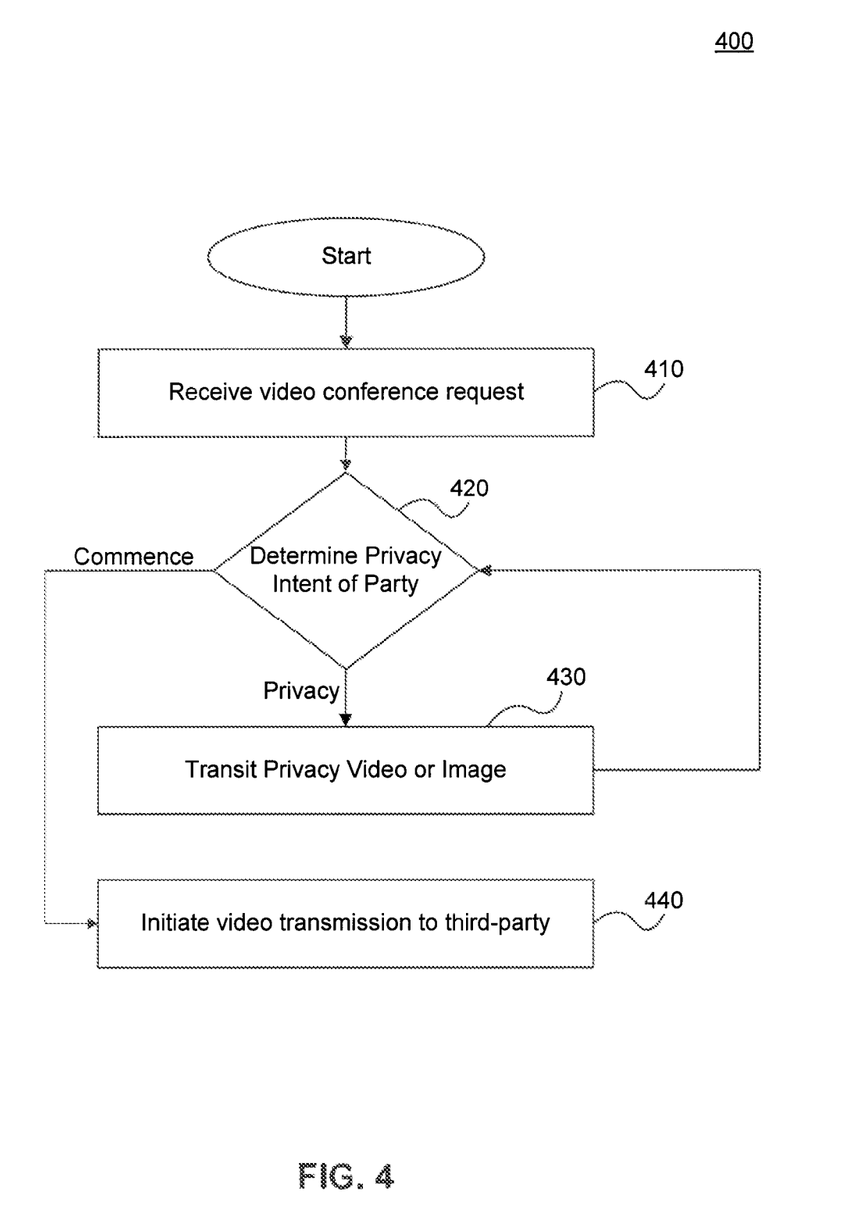
FIG. 4 is a flow diagram of a further method in accordance with embodiments.

In an embodiment, facial recognition technology may be used to determine when a party wishes to commence a video conference. FIG. 4 is a diagram of such a method 400.

At block 410, a video conference request is received. The video conference request may be received, in embodiments, by call control module 115 of video conference system 110. The video conference request may be received via network 105.

At block 420, a privacy intent of the party may be determined. The privacy intent of the party may be determined in part by a facial recognition module 111 and one or more privacy conditions stored in memory 123. For example, if the party is detected to be looking at the camera, facial recognition module 111 may determine, based on stored privacy conditions, that the privacy intent of the party is to transmit video and commence the video conference. If the party is detected to not be looking at the camera, facial recognition module 111 may determine the privacy intent of the party to be that she does not intend to commence the video conference.

If, at block 420, the determination is that the party wishes to be in a privacy mode, method 400 may proceed to block 430. At block 430, privacy images may be transmitted to the other parties to the video conference. Alternatively, a blank screen may be transmitted to other parties. Further, a message or other image may be transmitted to the other parties to the video conference.

If the determination at block 420 is that the party wishes to commence the video conference, method 400 may proceed to block 440. At block 440, video transmission may be initiated by video conference system 110.

Method 400 may then return to decision block 420 to determine the current privacy intent of the party. When the determination at decision block 420 is that the party wishes to commence the video conference, method 400 may proceed to block 440. In this way, the video conference can begin or commence when the party's privacy intent indicates that the conference should begin.

In embodiments, a manual privacy control may still be provided. The automatic privacy control as described herein may supplement the party's operation of the manual privacy control depending on privacy settings specified by the party.

In embodiments, facial recognition techniques may be used to assist in identifying members of the party using video conferencing system 110 to the third party. For example, a facial recognition module 111 may detect the identity or the name of a member of the party using video conferencing system 110. Accordingly, components of video conference system 110, such as video encoding logic 115, may cause video transport logic 121 to transmit the name of the members of the party to the third party, such as using text inserts to the video. Video encoding logic 115 may further outline faces of the members of the party, and include the names with the outlines, to allow the third party to identify who is speaking.

Figure 5:
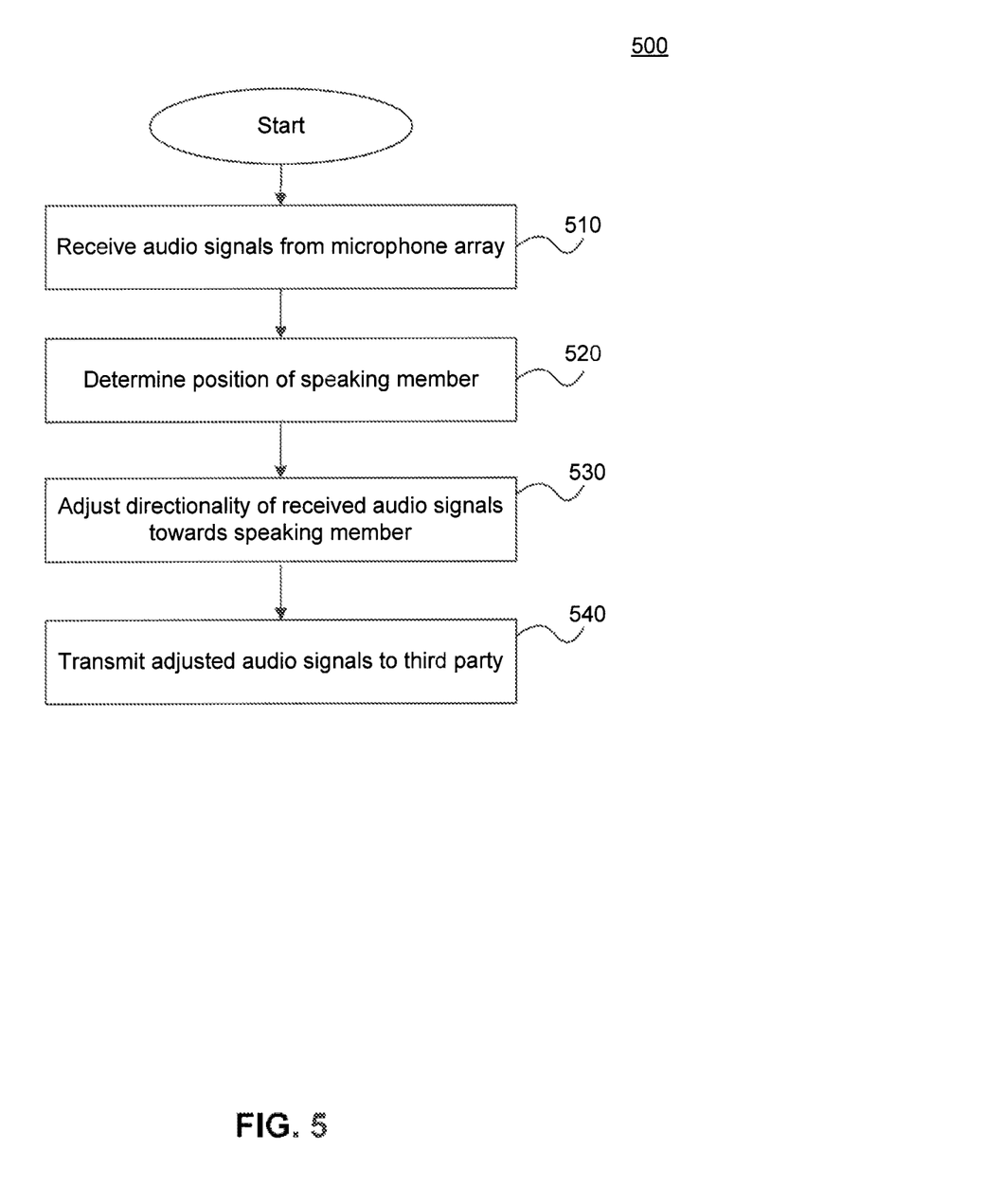
FIG. 5 is a flow diagram of a further method in accordance with embodiments.

In embodiments, facial recognition techniques may be used to improve the audio transmitted by video conference system 110. FIG. 5 is a diagram of a method 500 for transmitting audio for a video conference, in accordance with embodiments.

At block 510 of method 500, audio signals are received from a microphone array during a video conference between a party and a third party in accordance with known methods. For example, a video conference may have been initiated by either the party or the third party, and video and audio transmission may have begun. The party to the video conference may begin speaking to cause audio signals to be received from the microphone array.

At block 520 of method 500, a position of a speaking member of the party is determined, using facial recognition techniques. For example, the party may only include one person or member, who is seated directly in front of the video conferencing system 110 and microphone array 105. In such a situation, facial recognition module 111 may recognize the member's face and identify the member's position as being directly in front of microphone array 105. In a further example, the party may include two or more members. One or more of the members of the party may be speaking at any given time. Facial recognition module 111 may recognize the movement of various features of the speaking member's faces. For example, facial recognition module 111 may detect that a member's lips are moving, representing that the specific member is speaking.

The determined position of a speaking member of the party may be an angular position relative to the microphone array 105. For example, if the speaking member of the party is directly in front of the microphone array 105, the position of the party may be determined to be 0 degrees. If two members of the party are speaking, their determined positions may be, for example and without limitation, 30 degrees to the left of the center of the microphone array, and 45 degrees to the right of the center of the microphone array.

At block 530 of method 500, the directionality of the signals received from the microphone array may be adjusted towards the speaking member. For example, audio processing module 131 may adjust the directionality of the received signals towards the identified angular position of the speaker. The directionality of the signals may be adjusted towards the speaking member or speaking members of the party using a beam forming strategy. The beam forming strategy may adjust the directionality of the received signals using known phased array techniques for microphone arrays. The phased array may reinforce the arriving signals from the microphone array 105 according to the determined position of the speaking member or members, and insert signal receiving nulls for known noise sources. For example, once the angle of the speaker(s) position is known relative the microphone array (e.g. broadside, 45 degrees, etc.), respective electrical signals from the individual microphones can be delayed (or "phased") relative to one another to steer one or more receiving beams toward the speaking members. Further, respective electrical signals from the individual microphones can be scaled relative to one another. Likewise, or alternatively, the signal receiving nulls can be steered toward known noise sources to lessen their effect. Beam forming strategies may also include techniques such as blind source separation or other multiple microphone processing techniques.

At block 540 of method 500, the adjusted audio signals are transmitted to a third party during the video conference. The adjusted audio signals may emphasize the speech of the speaking party.

In a further embodiment, audio processing techniques may be used to determine the position of a speaking member of the party at block 520. For example, a microphone array may receive multiple signals from a speaking member of the party. Based on the measured delay between the multiple signals, the position of the speaking member may be determined by audio processing module 131. In an embodiment, audio processing may be used instead of facial recognition techniques.

In a further embodiment, facial recognition techniques and audio processing techniques may be used in conjunction to more accurately determine the position of a speaking member. For example, facial recognition may be used to determine a likely position or positions of a speaking member of a party. Audio processing may further refine the position of the party to adjust the audio signals in accordance with method 500.

Further, audio processing techniques may be used to confirm the identity of a speaking member and the location of the speaking member. For example, facial recognition techniques may be used to determine the identity of a speaking member of a party, such that the speaking member's name can be transmitted to a third party. Audio processing techniques, such as speech recognition, may be used to identify the speaking member as well. Thus, speech recognition may be used to confirm the speaking member's identity.

Method 500 may allow a video conference system 100 to transmit less feedback, background noise, or other undesired audio present in the party's location. For example, the party to the video conference may be at a location where construction is taking place. Adjusting the directionality of the received microphone signals may allow the background construction noise to be de-emphasized, and the speech of the speaking parties to be emphasized. This may provide an improved conference experience to the third party.

In embodiments, audio may be rendered on the third party video conferencing system according to the determined position of the speaking member of the party using video conferencing system 110. For example, if a speaking member of a party is determined to be 30 degrees to the left of the center of a microphone array, when audio is transmitted to the third party video conferencing system, it may be rendered and output by speakers or other audio outputs on the third party video conferencing system such that the audio appears to originate from the same angular position. In embodiments, the angular position of the rendered audio may not be exactly the sane as the determined angular position. For example, instead of outputting the audio to appear 30 degrees to the left of the center, it may be output such that it appears 30 degrees to the right of center, or any other angular position.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs miming in parallel on multiple machines.

The summary and abstract sections may set forth one or more but not all exemplary embodiments of the present invention as contemplated by the inventor, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A method of transmitting audio for a video conference, comprising:
receiving audio signals from a microphone array during a video conference between a party and a third party;
receiving an image of the party;
determining a position of a speaking member of the party by analyzing the image;
adjusting a directionality of the received audio signals towards the speaking member using a beam forming strategy, based on the position determined by analyzing the image; and
transmitting adjusted audio signals to the third party during the video conference.

2. The method of claim 1, wherein the determining step comprises determining the position of the speaking member of the party by analyzing facial movements in the image.

3. The method of claim 1, wherein the determining step comprises determining the position of the speaking member of the party using audio processing techniques.

4. The method of claim 1, wherein the determining step comprises determining the position of the speaking member of the party using facial recognition and audio processing techniques.

5. The method of claim 1, wherein the transmitting step comprises transmitting adjusted audio signals to the third party during the video conference such that the adjusted audio signals are rendered according to the determined position.

6. The method of claim 1, further comprising:
determining an identity of the speaking member of the party; and
transmitting a message representative of the determined identity of the speaking member of the party to the third party during the video conference.

7. The method of claim 1, further comprising reinforcing the received audio signals according to the determined position and attenuating the received audio signals for known noise sources.

8. A video conferencing system, comprising:
a call control module, configured to initiate and maintain a video conference between a party controlling the video conferencing system and a third party;
a microphone array, configured to generate signals from sounds of the party controlling the video conferencing system;
a camera, configured to capture an image of the party controlling the video conferencing system;
a facial recognition module, configured to determine a position of a speaking member of the party controlling the video conferencing system by analyzing the image;
an audio processing module, configured to adjust a directionality of the generated signals towards the speaking member using a beam forming strategy, based on the position determined by analyzing the image; and
a video transport module, configured to transmit adjusted audio signals to the third party during the video conference.

9. The system of claim 8, wherein the facial recognition module is further configured to determine the position of the speaking member of the party controlling the video conferencing system by analyzing facial movements in the image.

10. The system of claim 8, wherein the facial recognition module is further configured to determine the position of the speaking member of the party controlling the video conferencing system using audio processing techniques.

11. The system of claim 8, wherein the facial recognition module is further configured to determine the position of the speaking member of the party controlling the video conferencing system using facial recognition and audio processing techniques.

12. The system of claim 8, wherein the video transport module is further configured to transmit adjusted audio signals to the third party during the video conference such that the adjusted audio signals are rendered according to the determined position.

13. The system of claim 8, further comprising:
an identity module configured to determine an identity of the speaking member of the party controlling the video conferencing system;
wherein the video transport module is further configured to transmit a message representative of the determined identity of the speaking member of the party to the third party during the video conference.

14. The system of claim 8, wherein the audio processing module is further configured to reinforce the generated signals according to the determined position and attenuate the generated signals for known noise sources using facial recognition.

15. A non-transitory computer readable storage medium comprising instructions stored thereon that, when executed by a processor, cause the processor to:
receive audio signals from a microphone array during a video conference between a party and a third party;
receive an image of the party;
determine a position of a speaking member of the party by analyzing the image;
adjust a directionality of the received audio signals towards the speaking member using a beam forming strategy, based on the position determined by analyzing the image; and
transmit adjusted audio signals to the third party during the video conference.

16. The non-transitory computer readable storage medium of claim 15, further comprising instructions, that when executed by the processor, cause the processor to determine the position of the speaking member of the party by analyzing facial movement in the image.

17. The non-transitory computer readable storage medium of claim 15, further comprising instructions, that when executed by the processor, cause the processor to determine the position of the speaking member of the party using audio processing techniques.

18. The non-transitory computer readable storage medium of claim 15, further comprising instructions, that when executed by the processor, cause the processor to determine the position of the speaking member of the party using facial recognition and audio processing techniques.

19. The non-transitory computer readable storage medium of claim 15, further comprising instructions, that when executed by the processor, cause the processor to transmit adjusted audio signals to the third party during the video conference such that the adjusted audio signals are rendered according to the determined position.

20. The non-transitory computer readable storage medium of claim 15, further comprising instructions, that when executed by the processor, cause the processor to:
   determine an identity of the speaking member of the party; and
   transmit a message representative of the determined identity of the speaking member of the party to the third party during the video conference.

21. The non-transitory computer readable storage medium of claim 15, further comprising instructions, that when executed by the processor, cause the processor to reinforce the received audio signals according to the determined position and attenuate the received audio signals for known noise sources using facial recognition.

22. A method of transmitting audio for a video conference, comprising:
   receiving audio signals from a microphone array during a video conference from a party;
   receiving an image of the party; and
   adjusting a directionality of the received audio signals towards a speaking member of the party using a beam forming strategy, based on the image.

23. A method of transmitting audio for a video conference, comprising:
   receiving audio signals from a microphone array during a video conference from a party;
   receiving an image of the party; and
   adjusting a directionality of the received audio signals towards a speaking member of the party using a beam forming strategy, based on facial motions detected in the image.

* * * * *